(12) United States Patent
Martin et al.

(10) Patent No.: US 10,580,349 B2
(45) Date of Patent: Mar. 3, 2020

(54) BACKPLANE FOR EYE-MOUNTED DISPLAY

(71) Applicant: Spy Eye, LLC, Los Gatos, CA (US)

(72) Inventors: Paul Scott Martin, Palo Alto, CA (US); Renaldi Winoto, Los Gatos, CA (US); Ion Opris, San Jose, CA (US); Mihai-Costin Manolescu, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 14 days.

(21) Appl. No.: 15/892,891

(22) Filed: Feb. 9, 2018

(65) Prior Publication Data

US 2019/0251893 A1  Aug. 15, 2019

(51) Int. Cl.
*G09G 3/32* (2016.01)
*G02B 27/01* (2006.01)
*G09G 3/00* (2006.01)
*G09G 3/20* (2006.01)

(52) U.S. Cl.
CPC .......... *G09G 3/32* (2013.01); *G02B 27/0172* (2013.01); *G09G 3/003* (2013.01); *G09G 3/2081* (2013.01); *G09G 2300/0452* (2013.01); *G09G 2320/0626* (2013.01); *G09G 2320/0673* (2013.01); *G09G 2340/16* (2013.01)

(58) Field of Classification Search
CPC .................. G02B 27/0172; G09G 3/32; G09G 2320/0626; G09G 2320/0673
See application file for complete search history.

(56) References Cited

U.S. PATENT DOCUMENTS

| | | | |
|---|---|---|---|
| 4,871,247 A * | 10/1989 | Haynes | G02B 6/06 351/219 |
| 5,467,104 A | 11/1995 | Furness, III et al. | |
| 5,682,210 A * | 10/1997 | Weirich | G02B 27/017 345/32 |
| 5,694,428 A * | 12/1997 | Campana, Jr. | H04B 7/10 370/509 |
| 6,072,532 A * | 6/2000 | Chieh | H04N 7/035 348/467 |
| 6,563,480 B1 * | 5/2003 | Nakamura | G09G 3/32 315/169.1 |
| 7,626,562 B2 | 12/2009 | Iwasaki | |

(Continued)

FOREIGN PATENT DOCUMENTS

KR  10-2007-0115467  12/2007

*Primary Examiner* — Mihir K Rayan
(74) *Attorney, Agent, or Firm* — Fenwick & West LLP (57) ABSTRACT

An eye-mounted display includes a femtoprojector, which includes a backplane and a frontplane. The backplane receives data (e.g., data packets) that specify the image to be projected by the eye-mounted display. It converts this data to drive signals (e.g., current) to drive the frontplane. The frontplane contains an array of light emitters (e.g., LEDs) that produce light according to the drive signals, thus generating the desired image. In one approach, the image is deconstructed and transmitted to the backplane as needed as microframes which are displayed asynchronously and only for regions where the image has changed, rather than continuously scanning full picture frames at the full frame rate. In another aspect, the femtoprojector has variable pitch between adjacent light emitters.

22 Claims, 10 Drawing Sheets

(56) References Cited

U.S. PATENT DOCUMENTS

| | | | |
|---|---|---|---|
| 8,446,341 B2* | 5/2013 | Amirparviz | A61B 5/1455 |
| | | | 250/221 |
| 8,786,520 B2 | 7/2014 | Legerton et al. | |
| 8,786,675 B2 | 7/2014 | Deering | |
| 9,058,053 B2 | 6/2015 | Covington | |
| 9,488,837 B2* | 11/2016 | Nister | G02B 27/0172 |
| 2003/0067476 A1* | 4/2003 | Miller | G06F 3/011 |
| | | | 345/598 |
| 2004/0075634 A1* | 4/2004 | Gates | G09G 3/344 |
| | | | 345/99 |
| 2006/0007103 A1* | 1/2006 | Oh | G02F 1/133603 |
| | | | 345/102 |
| 2009/0189830 A1* | 7/2009 | Deering | G09G 3/02 |
| | | | 345/1.3 |
| 2009/0189974 A1* | 7/2009 | Deering | G09G 3/02 |
| | | | 348/46 |
| 2010/0289966 A1* | 11/2010 | Kobayashi | G09G 5/006 |
| | | | 348/725 |
| 2011/0085487 A1* | 4/2011 | Song | H04H 20/30 |
| | | | 370/312 |
| 2011/0175914 A1* | 7/2011 | Levanon | G06F 3/1454 |
| | | | 345/428 |
| 2012/0001832 A1* | 1/2012 | Braghis | G06F 3/1454 |
| | | | 345/2.2 |
| 2013/0135362 A1* | 5/2013 | Kim | G09G 3/20 |
| | | | 345/690 |
| 2014/0292620 A1 | 10/2014 | Lapstun | |
| 2015/0049004 A1* | 2/2015 | Deering | G09G 3/02 |
| | | | 345/8 |
| 2015/0312560 A1 | 10/2015 | Deering et al. | |
| 2018/0040676 A1 | 2/2018 | Hack et al. | |
| 2018/0120568 A1* | 5/2018 | Miller | G02C 11/10 |

\* cited by examiner

BACKPLANE FOR EYE-MOUNTED DISPLAY

BACKGROUND

1. Technical Field

This disclosure relates generally to backplanes used to drive light emitters in eye-mounted displays.

2. Description of Related Art

An eye-mounted display has been proposed by Deering. See, e.g. U.S. Pat. No. 8,786,675, "Systems using eye mounted displays." One type of eye-mounted display is based on a tiny projector mounted inside a contact lens. The projector projects images onto the retina of a person wearing the lens. The projector must be very small to fit in the contact lens, so small that Deering called it a "femtoprojector," where "femto" is a suggestive, rather than literal, prefix. A typical femtoprojector preferably is no larger than about one or two millimeters in any dimension.

Eye-mounted displays can be used for virtual reality applications and also for augmented reality applications. In virtual reality applications, the images projected by the eye-mounted display replace what the user would normally see as his external environment. In augmented reality applications, the images projected by the eye-mounted display augment what the user would normally see as his external environment, for example they may appear as overlays on the external environment.

Goggles and other types of head-mounted displays have also been proposed for these types of applications. Communicating image data to these types of head-mounted displays is a simpler problem because they can be larger in size than an eye-mounted display, they can consume more power and they can receive data over wired transmission. In contrast, eye-mounted displays present unique challenges because of their size and location mounted on the eye.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Femtoprojectors are projectors that are so small that they fit inside a contact lens and project images onto the user's retina. In augmented reality (AR) applications, the femtoprojector displays an image directly onto the retina that ideally is not distinguishable from the external scene, thus creating an augmentation to the real world. This task has several challenges. First, the human eye has very high resolution in the fovea which then drops sharply with angle outside the fovea. The human eye also has a large instantaneous photopic dynamic range of 10-12 bits. In addition, the human eye can further extend its dynamic range by adaptaion and use of scotopic vision to greater than 30 bits (1,000,000,000:1). Considering that even today's "High Dynamic Range" displays have only an 11-bit (~20,000:1) range for brightness (1000 nit to 0.05 nit), these are significant challenges.

In order to address these challenges and better match the external scene, it is advantageous for the femtoprojector to follow the eye's resolution mapping (highest resolution in the fovea and lower resolution in the periphery) and to follow both the instantaneous and the adaptive intensity dynamic range. Further complicating the task, the combination of high resolution (small pixels) and high dynamic brightness range with high optical efficiency of in-contact lens display which shines light directly onto the retina means that the photon output of each pixel typically will have a large range inclusive of very low intensities achieveable only by controlling the current to each pixel in the range of femtoamps. Even further complicating the problem is the additive nature of augmented reality. Light from the femtoprojector is additive to the light from the external scene. This sets a lower bound on the brightness of the augmented reality image if it is to be visible. Finally in any practical device, the data defining the images projected by the femtoprojector is limited by the data transmission rate to the contact lens. Limited data rate means that even if the display is theoretically capable of displaying a full field of view image indistinguishable from reality, the data available to the display on the contact lens to form such an image may limit the quality of the actual image projected.

The display functionality of a femtoprojector can be divided into a backplane and a frontplane. The display backplane typically is an application specific integrated circuit (ASIC) that receives data (e.g., data packets) that specify the image to be projected by the eye-mounted display. It converts the received data into drive signals (e.g., drive currents for LEDs) to drive the frontplane. The frontplane contains an array of light emitters (e.g., LEDs, VCSELS, OLEDs, possibly with an additional light wavelength conversion layer) that produce light in human visible wavelengths according to the drive signals, thus generating the desired image.

In an example system, a display includes frontplane and backplane chips and displays more than 260,000 pixel in a 512 by 512 pixel array. In some cases, the array is not laid out in a square Manhattan grid, but in a hexagonal grid and with a hexagonal boundary. Hexagonal grid displays are suited to match the hexagonal photoreceptors in the human eye and hexagonal boundary displays provide for efficient tiling of the human retina.

In some cases, it is possible to build the frontplane and backplane on the same planar substrate, such as is commonly done with OLED displays where the OLEDs are deposited directly on the Si CMOS backplane. Alternately, the frontplane and backplane can be manufactured separately and later bonded together to form electrical connections.

In a conventional display, the image data is typically communicated to the display using a protocol based on continuously scanning the entire array of light emitters. For example, a video may be divided into frames, each of which specifies intensity values for every light emitter in the array and which is updated at a given frame rate, typically 30-120 Hz. These intensity values may be arranged to scan from upper left to lower right of the display. The full frame data is received by the display at a frame rate that is fast enough to avoid flicker. However, this requires the display to receive and process a large quantity of data, which in turn requires a large data bandwidth and high power consumption. In addition, displays that are not eye mounted are designed knowing that the user may look at any portion of the display and, therefore, every portion of the display is designed to meet the most demanding resolution of the high resolution fovea.

In contrast, for eye mounted displays which are embedded into a contact lens, the position of the projected image on the retina is fixed and therefore the resolution of the display required to optimize the image on the retina is known. With this additional information, the display can be designed to have (variable) hardware pixel resolutions that match the known alignment of display to retina. This matching can also be done dynamically to accommodate slow movements of the contact lens on the eye and/or different position alignments on the retina. In both cases, the data rate sent to the display can be dramatically reduced without sacrificing the resolution perceived the observer.

Eye-mounted displays (EMDs) have additional unique constraints because of their size and the additive nature of the images created for AR applications. Accordingly, approaches that are suitable for externally located displays may not be suitable for eye-mounted displays. For example, in one approach more suitable for eye-mounted displays, the protocol is not based on continuously scanning and specifying every pixel of the full frame. Instead, the image is deconstructed into microframes, also referred to as subframes. For example, for a full frame size of 512×512, the subframe might be 36×2 (width×height). Only the subframes that are displayed are transmitted to the backplane and only during the time period when they are displayed. No data need be transmitted for blank areas of the frame or time periods when there is no display. For example, a short text message overlaid as part of an augmented reality application may require only a few subframes to specify, and only those subframes would be transmitted. The "blank" areas of the frame need not be transmitted. Accordingly, the data bandwidth to the backplane and the processing power load on the backplane may be reduced. The power consumption preferably is limited to 100 microwatts or less. The number of drivers in the backplane may also be reduced (e.g., 72 drivers for a 36×2 subframe compared to 512 drivers for a row-driven approach). This also reduces the area required for the backplane electronics, which is beneficial in reducing the size of the backplane chip thus reducing the obstruction of the ambient light by the backplane chip.

In another aspect, pixels are not required to be updated sequentially in time or space. That is, the data received by the backplane is not required to address display pixels in a predefined time sequence or a predefined spatial order. In one approach, each microframe has a header which defines where within the frontplane array to apply the microframe and how long to display the microframe. This feature can be used to reduce the data rate required to display an image on the retina. The display can be designed to match the characteristics of the human eye, for example refresh rate may be angle dependent. This is in contrast to a conventional display where the entire display is refreshed at a constant rate and in a predefined sequence.

The following is an example of augmented reality using these concepts. An observer is looking at a road with cars moving to the right and with trees in the foreground and a restaurant in the background. The EMD is being worn by the stationary observer and adds a label above a moving car and a name for the restaurant in the background. As the scene progresses, the label for the car moves with the car so this label has a different location within the femtoprojector for each frame time of display. In one approach, the data describing the pixels that make up the label do not have to be transmitted for each frame time. Rather, the data content for the label can be stored on the display backplane and only the starting address (or other location) is updated. The restaurant name is even simpler. The restaurant and observer both are not moving, so the restrauant name is displayed in the same position for each frametime. A signal to repeat the same data is transmitted to the EMD. Both the starting address (location) and the data defining the text are already stored in the backplane memory.

Figure 1A:
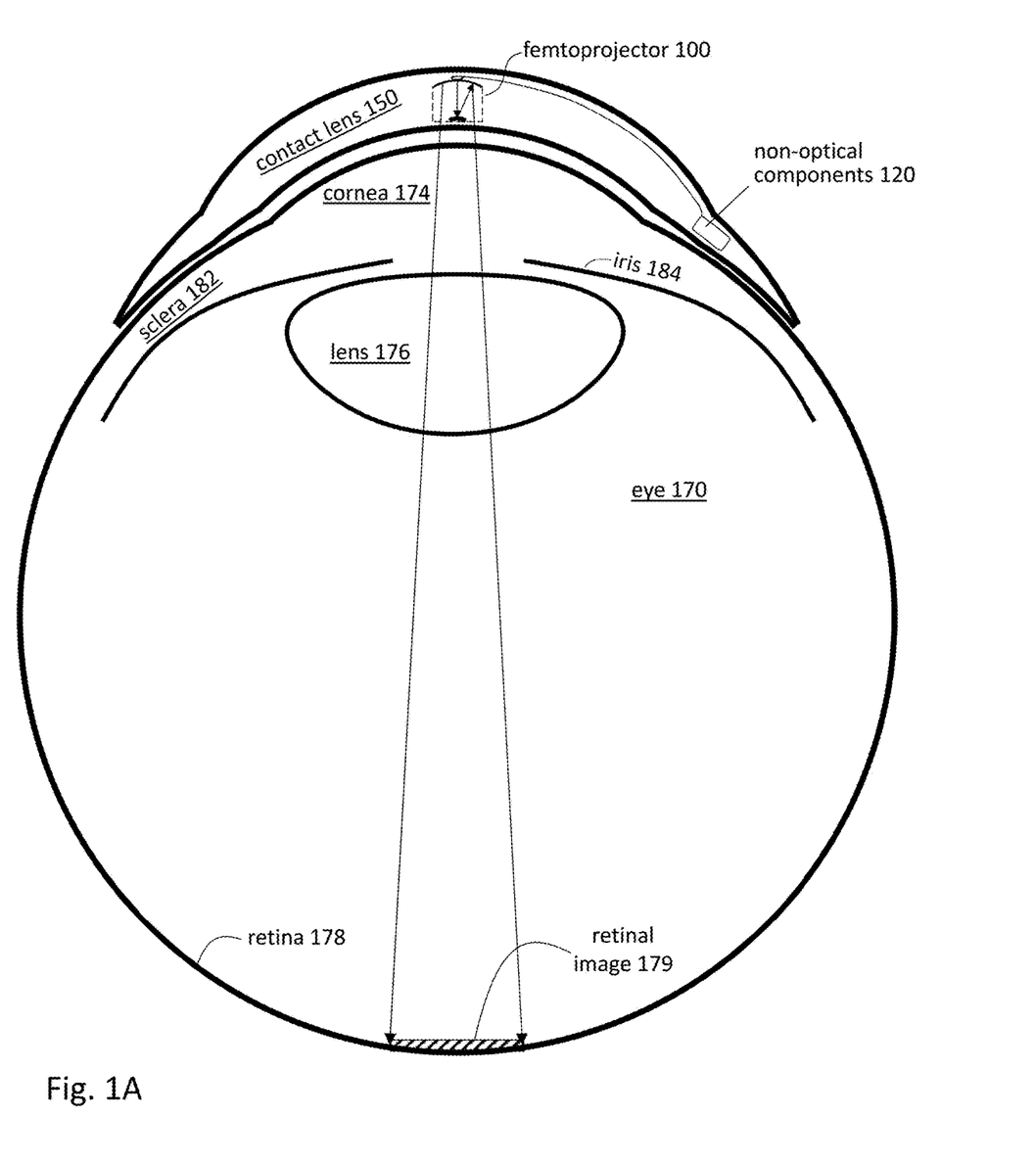
FIG. 1A shows a cross sectional view of an eye-mounted display containing a femtoprojector in a contact lens.

In more detail, FIG. 1A shows a cross sectional view of an eye-mounted display containing a femtoprojector 100 in a contact lens 150. FIG. 1A shows an embodiment using a scleral contact lens which is preferred because scleral lenses are designed to not move on the cornea, but the contact lens does not have to be scleral. The contact lens 150 is separated from the cornea 174 of the user's eye 170 by a tear layer. Over the cornea 174, the tear layer may be as thick as a hundred microns or more while it may be only a few microns thick over the sclera 182. The aqueous of the eyeball is located between the cornea and the crystalline lens 176 of the eye. The vitreous fills most of the eyeball including the volume between the intraocular lens 176 and the retina 178. The iris 184 limits the aperture of the eye.

The contact lens 150 preferably has a thickness that is less than two mm, and the femtoprojector 100 preferably fits in a 2 mm by 2 mm by 2 mm volume. The contact lens 150 is comfortable to wear and maintains eye health by permitting oxygen to reach the cornea 174.

In the example design of FIG. 1A, the optical path from the image source in the femtoprojector 100 to the image 179 on the retina 178 does not include any air gaps, although this is not required. As a result, the femtoprojector 100 embedded in contact lens 150 is insensitive to the air-cornea interface that provides most of the focusing power in an unaided eye. Further, the system is not affected by variations in cornea shape that occur from one person to another.

Figure 1B:
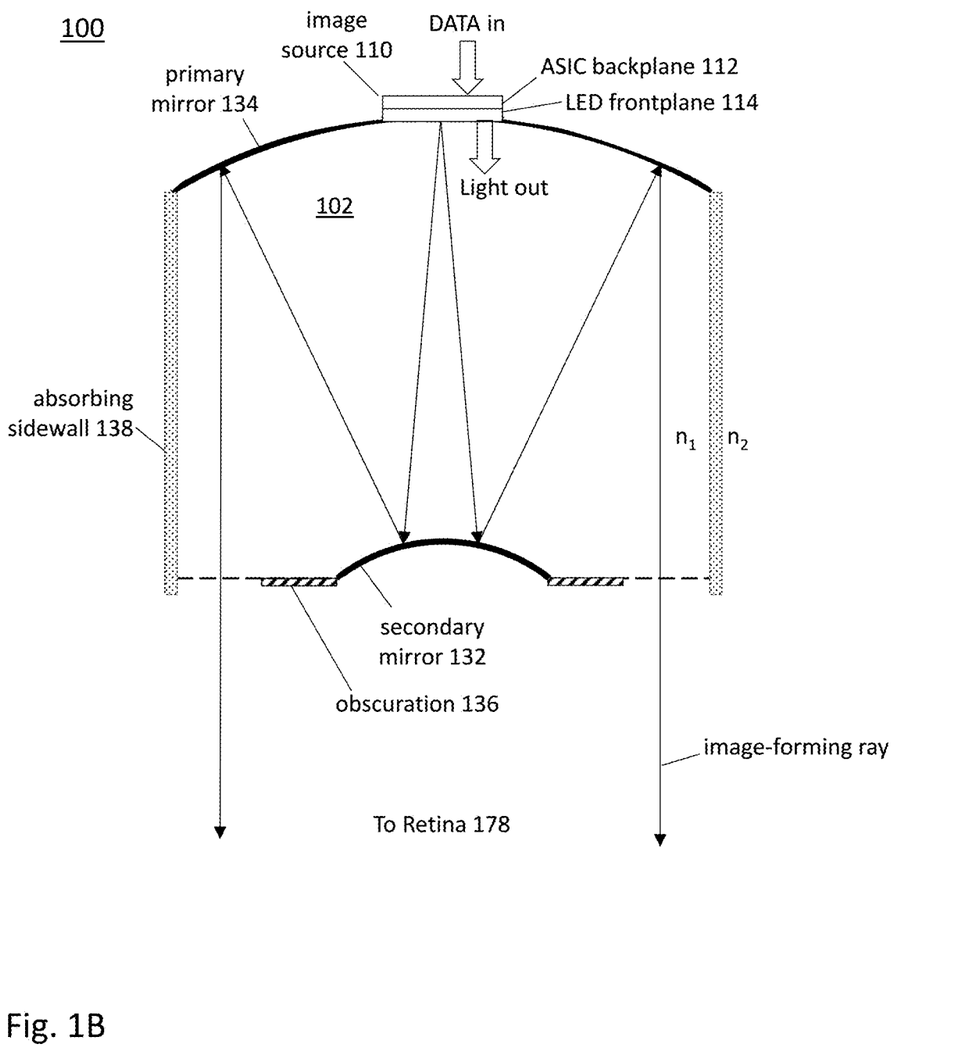
FIG. 1B shows a cross sectional view of a femtoprojector.

FIG. 1B shows a cross sectional view of one embodiment of a femtoprojector 100. It includes a solid, transparent substrate 102 having index of refraction $n_1$. Contact lens material, in which a femtoprojector optical system may be embedded, has an index of refraction $n_2$. The solid transparent substrate 102 may be made from plastic, glass or other transparent materials.

The femtoprojector 100 includes a concave primary mirror 134 and a convex secondary mirror 132. Either or both of these may be aspheric. The concave primary mirror 134 may be formed by coating an end of the substrate 102 with a reflective material such as a metal (e.g. aluminum or silver) or an engineered stack of dielectric layers. The primary mirror 134 includes an opening. An image source 110, such as an LED (light emitting diode) display chip with an array of individually addressable light emitters, is mounted at this opening. Alternate image sources include illuminated photomasks or single light emitting diodes, as examples.

The image source 110 includes a backplane 112 and a frontplane 114. In this example, the backplane 112 is an application specific integrated circuit (ASIC) and the frontplane 114 is an LED array. The ASIC 112 and LED array 114 are manufactured separately and later bonded together to form electrical connections. Alternately, the backplane 112 and frontplane 114 can be integrated on a single common substrate. The electronics 112 receive data packets from a source external to the eye-mounted display. The ASIC 112 converts the data packets to drive currents for the LED array 114, which produces light that is projected by the optical system to the user's retina 178. To save power, the ASIC 112 may power down the LED array 114 (or parts of the LED array 114) when no data packets are received. Memory is preferably included in the backplane. It can be used to store the microframe display location (e.g., starting address) and microframe pixel values. In that case, only the changes from previous values can be transmitted. If the data packets are clocked, the no signal situation may be detected when there is no clock present, for example if there is no clock signal on clock input pins or if no clock can be recovered from the incoming data stream. In one approach, when the clock is lost, the backplane power to the LED frontplane is shut down as a safety precaution.

Figure 1C:
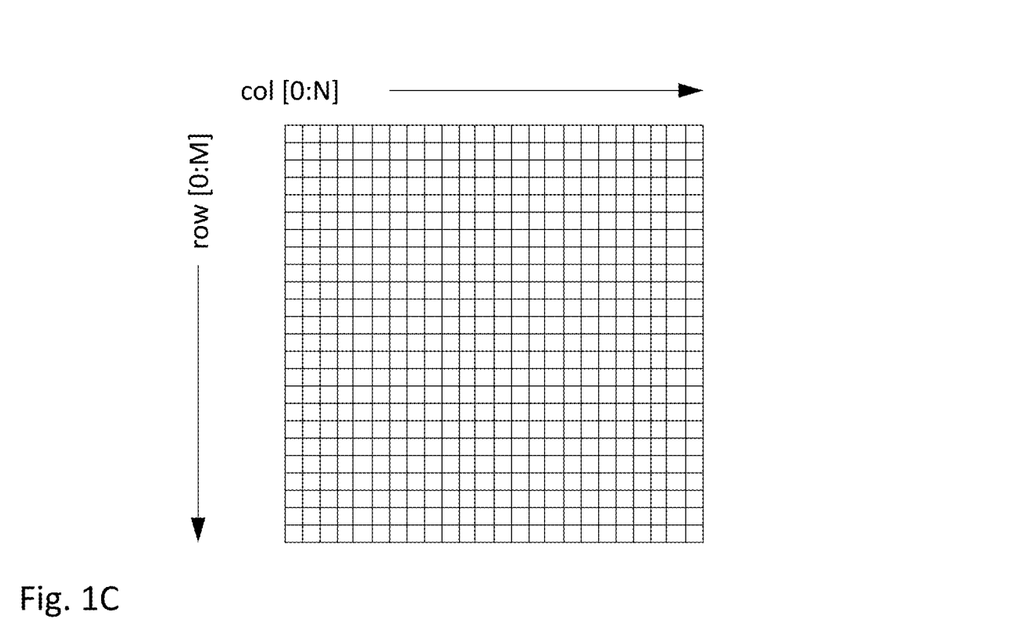
FIG. 1C shows addressing of a rectangular array of light emitters.
Figure 1D:
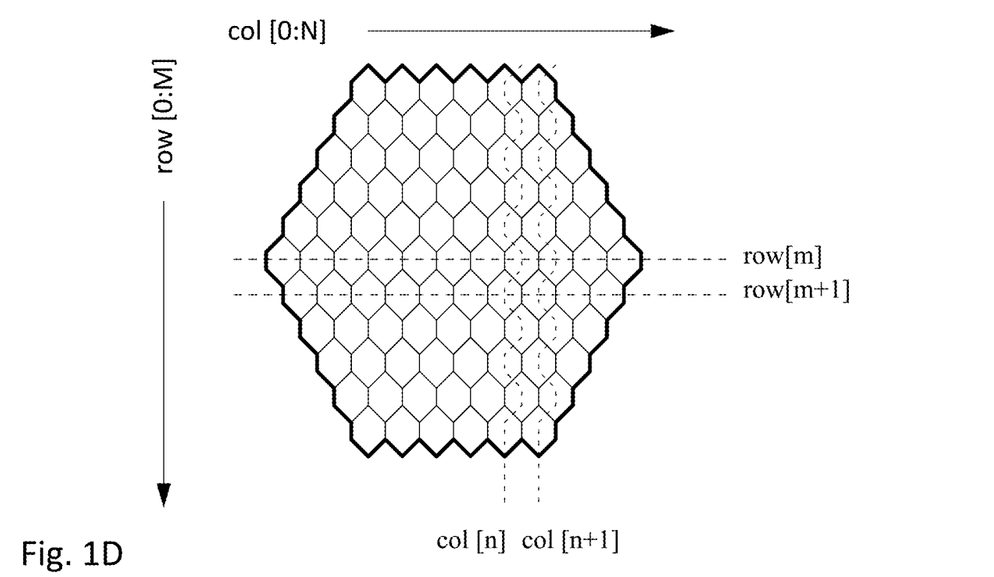
FIG. 1D shows addressing of a hexagonal array of light emitters.

The array of light emitters 114 can have different geometries. FIG. 1C shows row and column addressing for an N×M rectangular array of light emitters. FIG. 1D shows row and column addressing for an N×M hexagonal array of light emitters. In FIG. 1D, not every (row,column) address corresponds to an actual light emitter. For convenience, individually addressable light emitters will also be referred to as pixels. The array of light emitters can also have non-uniform resolution. For example, the central area of the array may be imaged onto the fovea and therefore the center pixels have higher resolution (i.e., smaller pitch between pixels) compared to pixels on the periphery of the array. The pitches of the frontplane and backplane may be matched, in which case there will be less area for each pixel driver in the center of the backplane compared to the periphery. Alternately, the backplane may have a uniform pitch, where the frontplane still has a variable pitch. In one approach, a wiring layer bridges between the uniform pitch backplane and variable pitch frontplane. By using different wiring layers, the same backplane can be used with different frontplanes.

The secondary mirror 132 faces the image source 110, and the primary mirror 134 faces the secondary mirror 132. Light rays from the image source 110 are first incident on and reflected by the secondary mirror 132 (convex in this example). The reflected rays are then incident on and further reflected by the primary mirror 134 before exiting the optical system. The primary mirror 134 is "primary" because it is bigger than the secondary mirror 132. The secondary mirror 132 and primary mirror 134 cooperate to project the image from the image source 110 onto the user's retina.

However, not all light rays from the image source 110 may be successfully projected as part of image formation. Those light rays that are successfully projected to form an image are referred to as image-forming rays. The remaining light rays from the image source 110 are referred to as stray rays. In this example, the femtoprojector 100 also includes a light baffle system to block or at least reduce the stray rays that reach the exit aperture and/or to direct exiting stray rays to areas away from the projected image. In FIG. 1B, the baffle system includes an annular obscuration 136 and absorbing sidewalls 138 (or other types of side baffles). In this example, the obscuration 136 is an annular, absorbing ring that surrounds the secondary mirror 132. It may be made by depositing an absorbing material such as carbon, roughened or etched nickel ("nickel black"), black chrome, or Vantablack (Surrey NanoSystems, Newhaven, UK) around the secondary mirror 132. The sidewalls 138 may be part of the femtoprojector or part of a surrounding structure in which the optical system is mounted. Absorbing or black sidewalls may also make the femtoprojector less visible to others.

Figure 2:
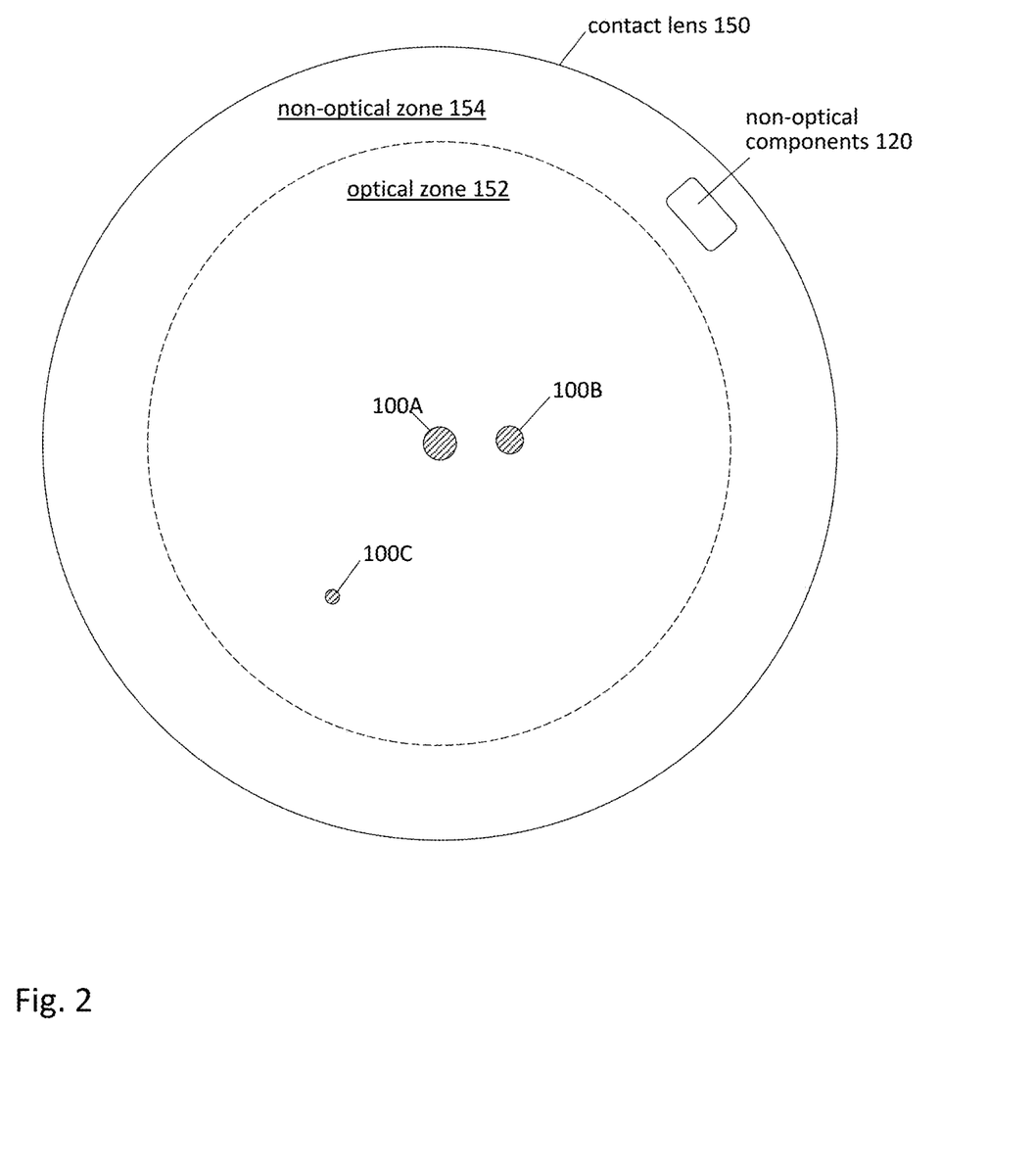
FIG. 2 shows a plan view of an eye-mounted display containing multiple femtoprojectors in a contact lens.

FIG. 2 shows a plan view of an eye-mounted display with multiple femtoprojectors 100A-C in a contact lens 150. This plan view is taken looking at the display from the top of FIG. 1A. The ratio of the maximum pupil diameter diameter, approximately 8 mm, to the femtoprojector lateral size is preferably roughly 8:1 for the largest femtoprojector. Note that different femtoprojectors project images to different sections of the retina. Accordingly, femtoprojectors that project to the fovea preferably have higher resolutions at the retina than those that project to the periphery. The ratio of femtoprojector size to maximum pupil diameter is normally between about 5:1 and 15:1, but may be as small as 4:1 or as large as 20:1. FIG. 2 shows three femtoprojectors 100A-C in the contact lens, but many femtoprojectors, or only one, may be mounted in such a lens. Eye-mounted displays with as many as 49 femtoprojectors in a contact lens have been proposed. If there is only one femtoprojector in a lens, it need not be in the center of the lens. The femtoprojectors 100A-C in FIG. 2 are also shown as different sizes, although they could also be the same size. Note that the image size on the retina is dependent on both the size of the light emitter array on the frontplane and the magnification of the femtoprojector optics.

In FIG. 2, the contact lens 150 is roughly divided by the dashed circle into an optical zone 152, typically defined by the maximum dilated pupil diameter, and a non-optical zone 154. Components in the optical zone 152 (such as the femtoprojectors 100) may be in the optical path of the eye, depending on how far open the iris is. Components 120 in the non-optical zone 154 fall outside the aperture of the eye. In addition to the femtoprojectors 100, the contact lens may also contain other components for data transmission, power and/or positioning. Data transmission components may include antennae or optical/infrared photodetectors, data storage and buffering, controls, and possibly also on-lens processing. Power components may include coils for power transmission and batteries for power storage. Positioning components may include accelerometers and fiducial or other structures used for eye tracking and head tracking.

In addition to the eye-mounted display, the overall system may also include a head tracker, eye tracker and scaler. The system receives input images (including possibly video), which are to be displayed to the human user via the eye-mounted display. The femtoprojectors project the images on the user's retina, thus creating an image of virtual objects in the user's field of view. The scaler receives the input images and produces the appropriate data and commands to drive the femtoprojectors. The head tracker and eye tracker provide information about head movement/position and eye movement/position, so that the information provided to the femtoprojectors can be compensated for these factors.

There are many ways in which this functionality can be configured with an eye-mounted display(s) to create embodiments of eye-mounted display systems. Portions of these subsystems may be external to the user, while other portions may be worn by the user in the form of a headpiece or glasses. Components may also be worn on a belt, armband, wrist piece, necklace or other types of packs.

Figure 3:
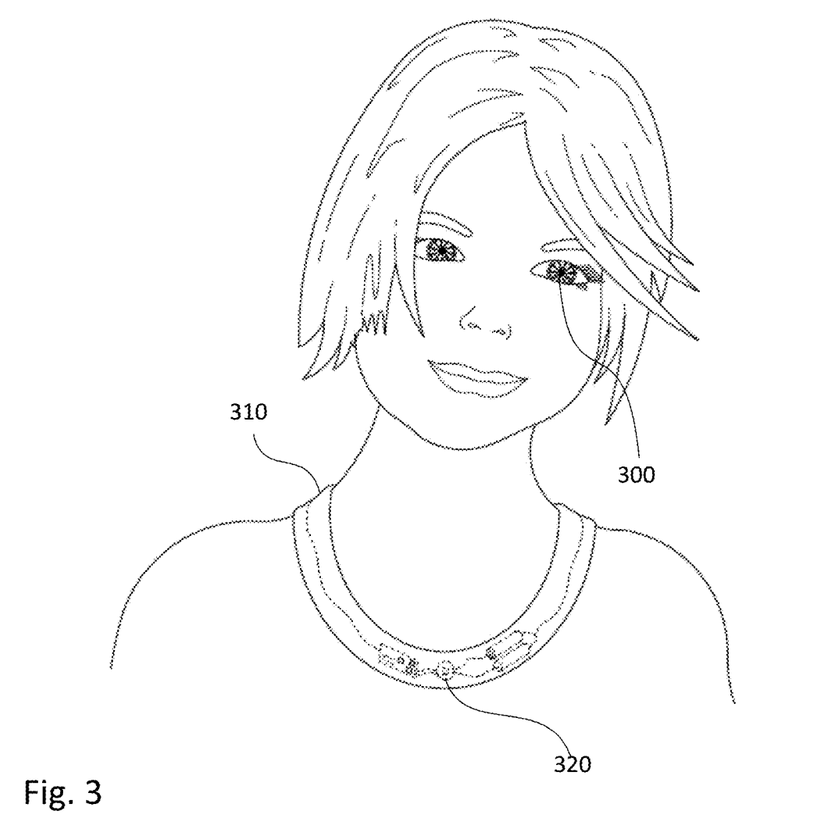
FIG. 3 shows a user wearing a necklace in communication with an eye-mounted display.

For example, FIG. 3 shows an implementation where, in addition to the eye-mounted display 300, the user is also wearing a necklace 310 that contains components of the eye-mounted display system. In this example, the necklace 310 includes a wireless transmitter 320 that transmits image data to the eye-mounted display 300. For an eye-mounted display, this transmission preferably is lower bandwidth, both because the available bandwidth is limited and because it is desirable to reduce the complexity and power consumption of electronics in the eye-mounted display.

Figure 4:
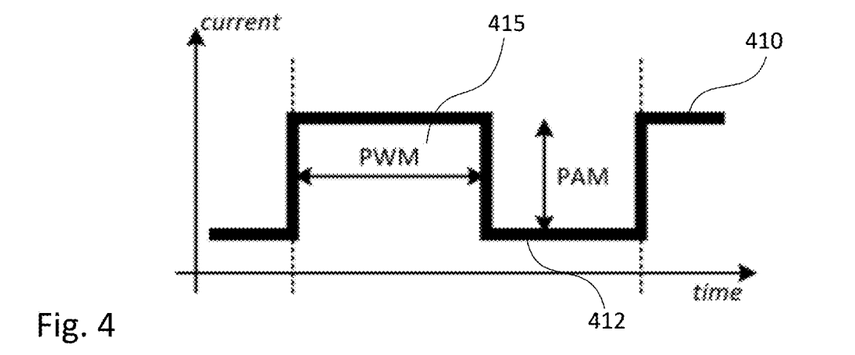
FIG. 4 plots drive current as a function of time, using a combination of pulse width modulation and pulse amplitude modulation.

In one approach, data packets specify pixel values using a combination of pulse width modulation (PWM) and pulse amplitude modulation (PAM). FIG. 4 plots the drive current applied to a pixel as a function of time using this scheme. The drive current toggles between a high state 410 and a low state 412. The low state is typically an "off" state and the backplane may even power down drive circuitry during the off state. Accordingly, the light emitter produces a pulse 415 of light. The PWM determines the duty cycle of the drive current and the duration of the light pulse. The PAM determines the high state (or the difference between low state and the high state, also known as the modulation depth) of the drive current and the intensity of the light pulse.

For example, if 12 bits are used, there may be 6 bits (64 levels) allocated to define the PWM and 6 bits (64 levels) allocated to define the PAM. A backplane with the capability for 6 bits PWM and 6 bits PAM is usually preferred over a backplane that uses only PWM, because 12 bits PWM typically will require a more accurate and faster clock, which requires more complex circuitry and higher power consumption. The mixed approach is also usually preferred over a backplane that uses only PAM, because 12 bits PAM typically will require a high resolution D/A converter, which requires more complex circuitry and typically suffers from linearity issues. Furthermore, combining PWM and PAM allows more flexibility to meet safety limits on both peak and average optical intensity.

Figure 5A:
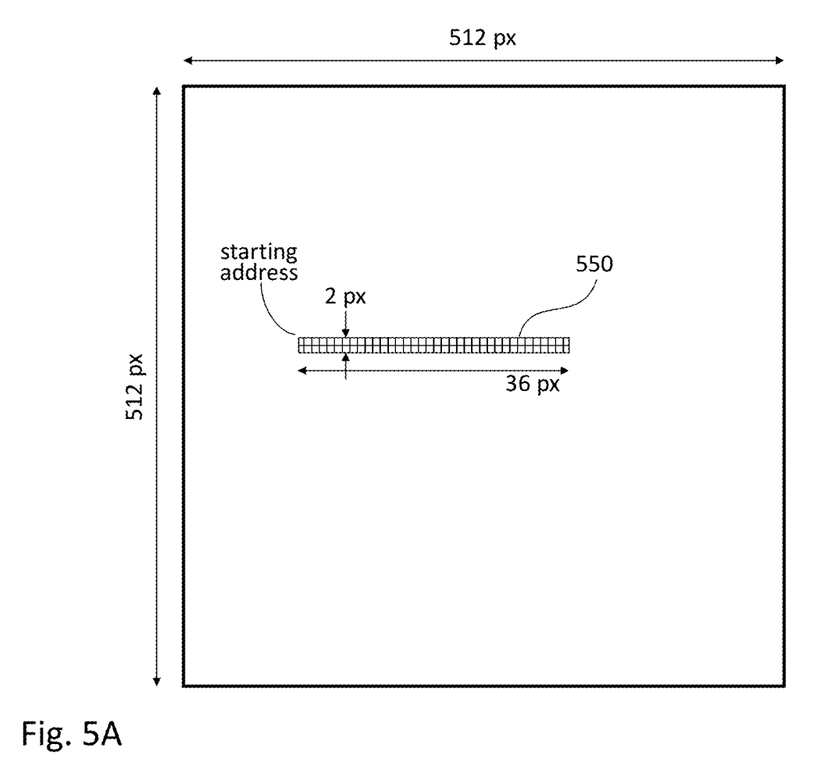
FIG. 5A shows a subframe within a full frame.
Figure 5B:
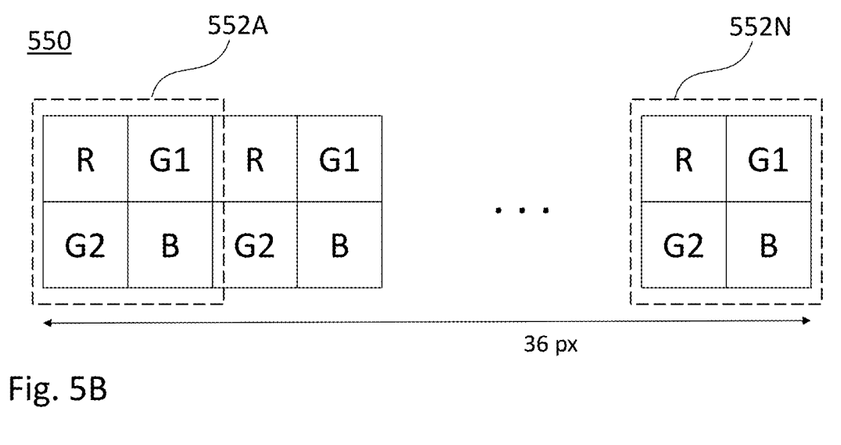
FIG. 5B shows additional structure of the subframe.
Figure 5C:
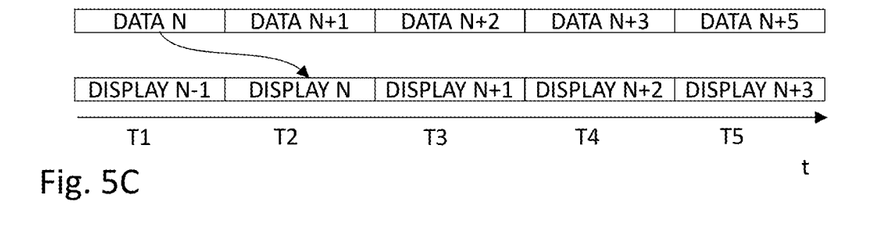
FIG. 5C shows timing of the data transmission and image display for subframes.

In another aspect, the images to be projected are deconstructed into subframes. FIGS. 5A-5C illustrate a 36×2 subframe for use with a 512×512 LED array on the frontplane. FIG. 5A shows the 512×512 full frame, as in FIG. 1C. The subframe 550 in this example is a stripe that is 36 pixels wide and 2 pixels tall. It is specified by its location within the subframe 550. In FIG. 5A, the location is specified by the upper left pixel, marked "starting address." The subframe is also specified by the pixel values for each of the 36×2=72 pixel values in the subframe.

FIG. 5B shows additional structure of the subframe. In this example, the subframe 550 is organized into 2×2 tiles 552A-N (where N=18). Each of the eighteen tiles has 4 pixels: one red (R), one green (G1), a second green (G2) and one blue (B). The subframe can also be organized into four groups, one for each of the pixels within a tile. Group-0 includes the eighteen R pixels, group-1 includes the G1 pixels, group-2 includes the G2 pixels and group-3 includes the B pixels. In some cases, groups-1 and -2 may be treated together since both are green pixels.

FIG. 5C illustrates timing of the data transmission and subsequent image display. During time period T1, the data packet for subframe N is received by the backplane. The corresponding light pulses are projected by the light emitters during the next time period T2, as indicated by the curvy arrow. Also during time period T2, the backplane receives the data packet for subframe N+1, which is displayed during the next time period T3. And so on.

Note that the subframes are not required to be in scan order for the LED array. Subframe N might be located in the upper left of the array, subframe N+1 might be the two rows directly below, and subframe N+2 might then be at some other arbitrary location in the array. In this way, if parts of the image are blank as may be the case for augmented reality, only those subframes containing image data need be transferred and displayed. In one implementation, the backplane includes 72 analog drivers that each is coupled to one of the corresponding 72 LEDs for each subframe.

In one approach, data packets can arrive at any time and there may be temporal gaps between subframes. In one example, the ASIC has a buffer that stores just one subframe. As such, there is no particular display update rate or refresh rate. The update rate is just the rate at which new data is received. The data rates required can vary significantly depending on the amount of imagery and the refresh rate. For AR images that are small, such as a few letters, and not frequently updated, the data rate can be fairly low. At the other extreme, the EMD may produce full video images with 50-100 Hz full frame refresh rates.

In addition, in FIG. 5C, each subframe is shown as displayed for the same amount of time. In an alternate approach, each subframe may also specify how long it is to be displayed. In some designs, the drive signals are not persistent. That is, the drive signals produced by the backplane cause a corresponding subset of light emitters to produce light, but only when the drive signals are applied. Once the backplane no longer produces those drive signals, those light emitters also cease to produce light. This is in contrast to a conventional display where pixel values are used to set transistors during a write cycle, but the light emitter then continues to produce light after the write cycle is completed because the transistor remains as on.

In addition, the size and shape of the subframe trades off various factors. If the subframe size is too large, it defeats the purpose of being able to send small amounts of data when most of the frame is blank. There is no need to send data to an area of the display if there is nothing to show there. If the subframe size is too small, the fraction of the data packet devoted to overhead becomes large, wasting limited data bandwidth.

In one approach, a protocol for data packets using subframes (referred to as microframes below) is defined by a combination of PWM and PAM and specifies the following:
  Location of the microframe (e.g., starting address for the lower left pixel of the microframe)
  Duration of the microframe (e.g., number of clock cycles that the microframe is applied)
  Values for each pixel in the microframe, which is defined by a combination of pulse amplitude modulation (PAM) and pulse width modulation (PWM). Different encodings are possible, and the specific encoding used may be defined in the packet header.

The data packet may also include other fields, such as additional header information and checksums. Examples of header information include sync frames, identifying information (e.g., source identifier or sink identifier), and control and diagnostic signals.

The encoding of individual pixel values uses a combination of PAM and PWM, with different encodings possible. For example, the encodings can use different numbers of bits and could be linear or logarithmic (to better match the large dynamic range and response of the eye). The encodings can also use a combination of global values that apply to all pixels in the microframe, local values that apply to some of the pixels in the microframe, and pixel-specific values that apply to individual pixels in the microframe. The specific encoding used can be defined by bits in the packet header.

In one approach, the PAM encoding is specified by the following:

PAM_COM is a global PAM multiplier that applies to all pixels in the microframe.

PAM_GROUP[J] is a local PAM multiplier that applies to all pixels in a group-J. Group-0 is the R pixels so PAM_GROUP[0] specifies the multiplier to be applied to all R pixels in the microframe. Group-1 is the G1 pixels, group-2 is the G2 pixels and group-3 is the B pixels.

The total PAM multiplier for a pixel in group J is given by PAM_COM×PAM_GROUP[J]. Both PAM_COM and PAM_GROUP[J] can be chosen to be linear or logarithmic.

The overall PWM encoding is specified as follows:

PWM_BITS determines the number of bits used for PWM.

PWM_GAMMA determines whether the PWM mapping is linear or non-linear with gamma=2.

PWM_PIXEL[K] determines the PWM value for each pixel K.

Figure 6A:
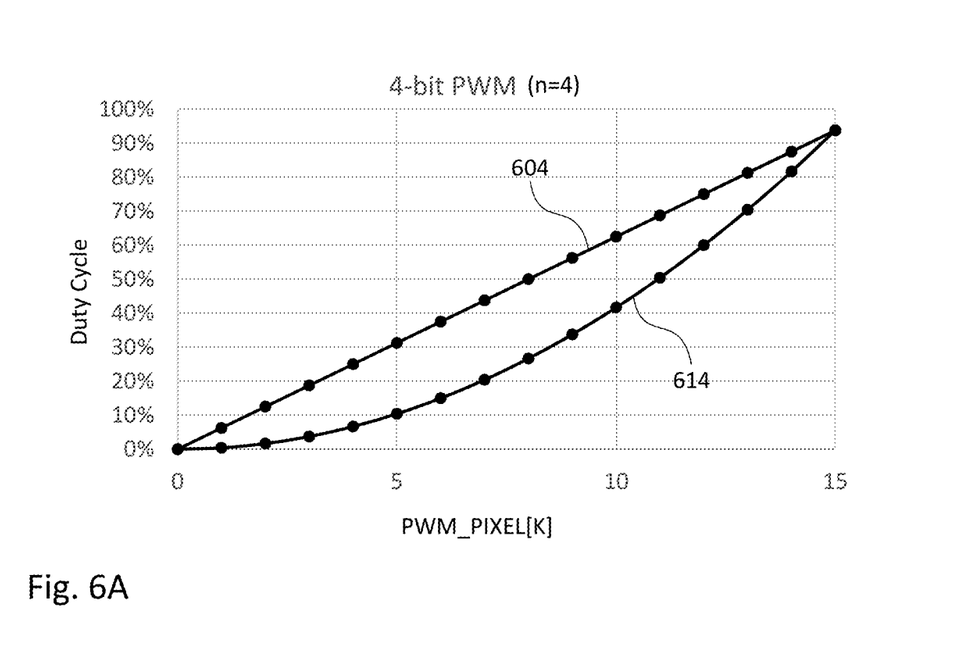
FIGS. 6A and 6B show PWM mappings for 4-bit and 6-bit deep PWM, respectively.
Figure 6B:
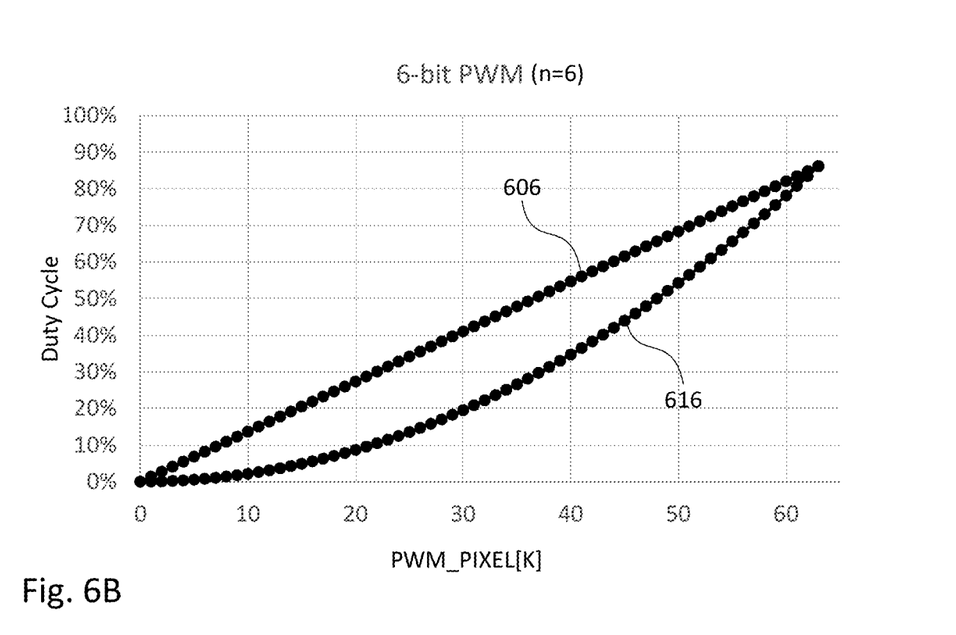

PWM_BITS and PWM_GAMMA apply to all pixels in the microframe and determine the PWM mapping. The mappings of PWM_PIXEL[K] to duty cycle for n=4 and n=6 (determined by PWM_BITS) are shown in FIGS. 6A and 6B, respectively. The top lines 604, 606 are the linear mapping and the bottom curves 614, 616 are for the gamma=2 mapping (as determined by PWM_GAMMA).

Note that the PAM is not pixel-specific. It has two components, one of which is global and one of which is group-specific. The global factor PAM_COM represents a general brightness of the microframe as a whole. In this example, each group is a set of same color pixels, so each local factor PAM_GROUP[J] is the general brightness of that color within the microframe. Here, group-1 and group-2 are both green so one local factor could be used for both of these groups. Individual pixel variations are then determined by the PWM.

Figure 7A:
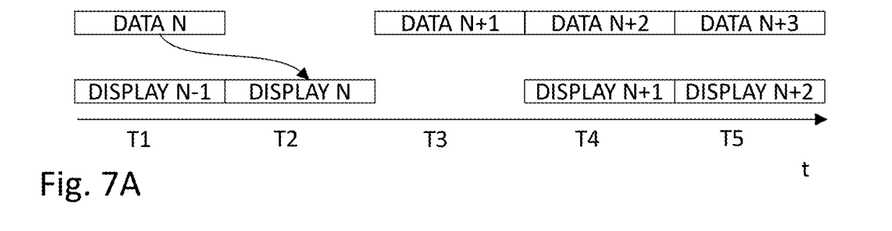
FIGS. 7A and 7B show timing of the data transmission and image display for subframes without and with driver persistence, respectively.
Figure 7B:
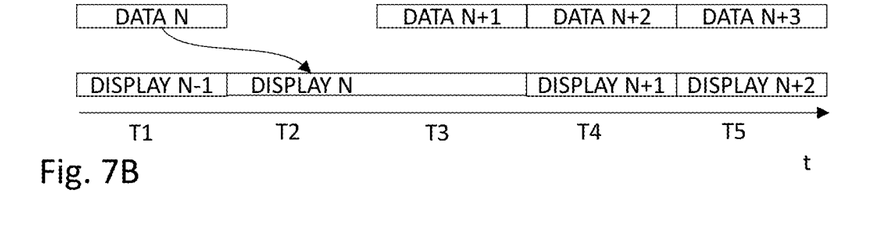

This is just an example. Other variations of the PAM and PWM encodings will be apparent. The data packets can also include other encodings or commands. For example, the data packet may include a DRIVER_PERSIST flag that determines whether to turn off the drive signals at the end of the microframe, as explained in FIGS. 7A and 7B. In these figures, there is a gap between data packets N and (N+1) when no data packet is received. If DRIVER_PERSIST is not set, then the drive signals turn off and the LEDs stop producing light at the end of the microframe, as shown by DISPLAY N in FIG. 7A. However, if DRIVER_PERSIST is set, then the drive signals stay on and the LEDs produce light for time period T2 and also for the next time period T3 for which there was no additional data packet received, as shown by DISPLAY N in FIG. 7B.

As another example, there may be a flag REDO_FRAME. When set, the previous microframe is repeated but possibly at a different location and/or for a different time duration, as specified in the data packet. The data for the previous microframe is stored in memory, so using this flag reduces the data transmission bandwidth since that data need not be re-transmitted. This may be useful, for example, in moving the label with the car in the example below. A flag REPEAT_FRAME may specify that the previous microframe is to be repeated at the same location and for the same time duration. This may be useful, for example, in maintaining the restaurant name in the example below.

Figure 8A:
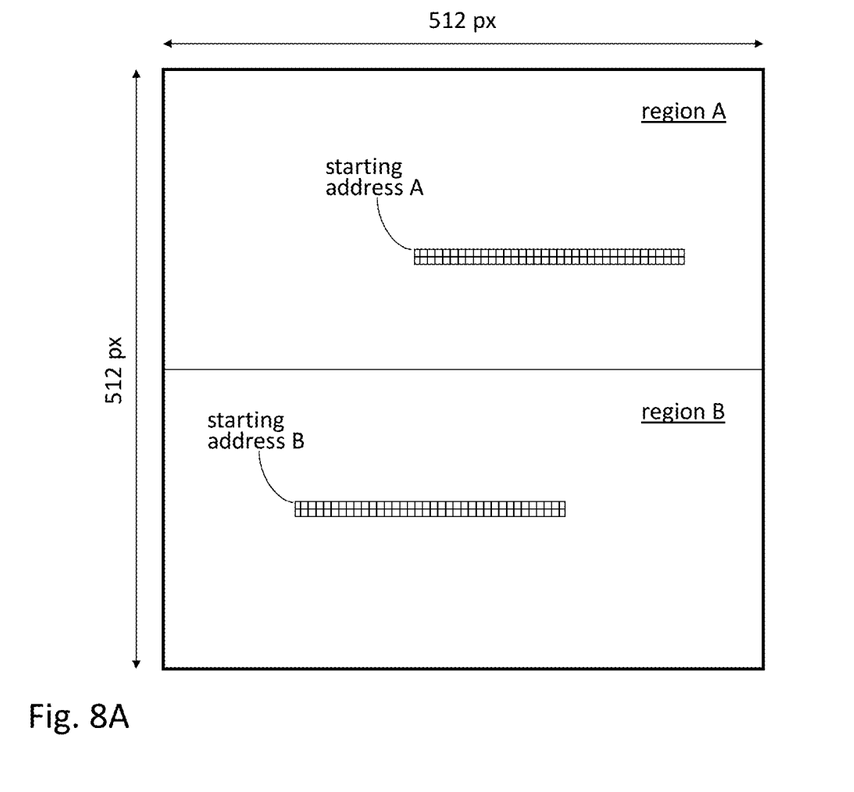
FIG. 8A shows two subframes within a full frame.
Figure 8B:
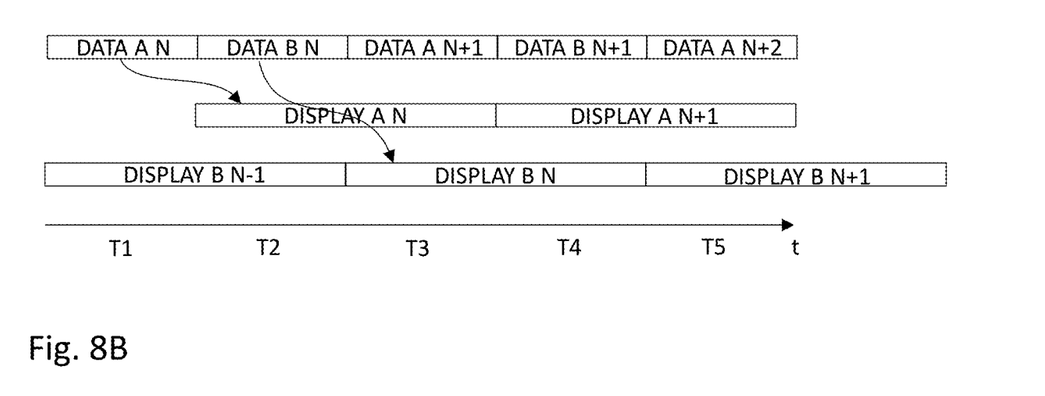
FIG. 8B shows timing of the data transmission and image display for subframes using double data rate transmission.

FIGS. 8A and 8B illustrate an implementation that uses double data rate transmission, where two 36×2 subframes are interleaved. FIG. 8A shows the 512×512 full frame, as in FIG. 5A. The full frame is divided into two regions A and B. Two subframes 550A and 550B are received and displayed in an interleaved fashion. Subframe 550A is located within the top half region A, and subframe 550B is located within the bottom half region B. Each subframe is 36 pixels wide and 2 pixels tall, as before. Data packets using the protocol described in Table I can be used to specify each subframe.

FIG. 8B illustrates timing of the data transmission and image display. During time period T1, the data packet for subframe N for region A is received by the backplane. The corresponding light pulses are projected by the light emitters in region A during the next two time periods T2 and T3, as indicated by the arrow. The light emitters stay on for two periods, because the next data packet for region A is not received until time period T3. To achieve the same total energy as in the single rate example of FIG. 5, the peak intensity can be halved because the pulse duration is doubled. During time period T2, the backplane receives the data packet for subframe N for region B, which is displayed during the two time periods T3 and T4. And so on. Note that the subframes are not required to be in scan order for the LED array. This is a double data rate example, but other multiples could also be implemented. In one design, the backplane contains 144 drivers, half driving the LEDs for the subframe in region A and the other half driving the LEDs for the subframe in region B.

Figure 9:
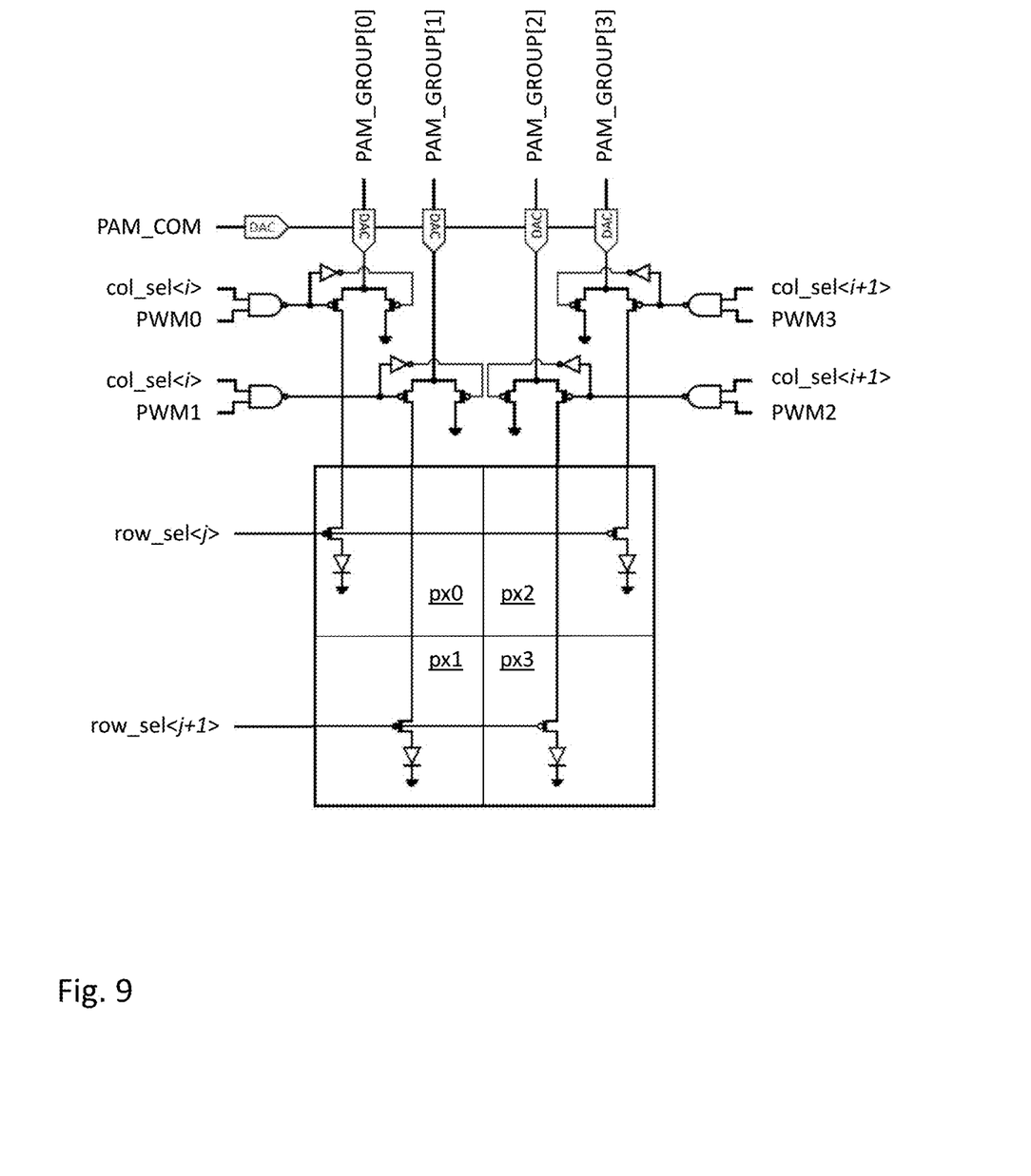
FIG. 9 is a circuit diagram of backplane and frontplane circuitry illustrating combined PWM and PAM control.

FIG. 9 is a circuit diagram of backplane and frontplane circuitry illustrating combined PWM and PAM control. This diagram shows circuitry that generates the current drive signals for four pixels px0-px3 in a 2×2 tile. The global value PAM_COM drives a DAC which is common to all four drive signals. The local values PAM_GROUP[0]-[3] add the group-specific component via their respective DACs. The output of the DAC driven by PAM_GROUP[0] provides an amplitude-modulated current for pixel px0. The PWM of this current is provided by PWM0, which is a pulse width modulated timing signal. The current drive signals for pixels px1-px3 are similarly generated. Note that in the protocol above, the current defined by PAM_COM and PAM_GROUP[0] drives pixel p0 in FIG. 9 and the same current also drives all the other px0's in the other 2×2 tiles of the microframe. The timing signal PWM0, however, can be different for each px0 in the microframe.

Pixel addressing in FIG. 9 is shown as row and column addressing using row select signals (row_sel) and column select signals (col_sel). This is one approach. However, then 512 DACs are required, one for each column, even though the microframe contains only 72 pixels. In an alternate approach, 72 DACs are used (in addition to the common DAC driven by PAM_COM), but the DACs can be coupled to different column lines.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A backplane that fits in an eye-mounted display, the backplane receiving data packets that specify images to be projected by a frontplane containing an array of light emitters that also fits in the eye-mounted display, the backplane converting the data packets to drive signals that drive corresponding subsets of the light emitters in the frontplane, where:
   the data packets specify subframes to be projected by the corresponding subsets of light emitters using a protocol that does not require receiving full frames for the entire array of light emitters; and
   the drive signals cause the corresponding subsets of light emitters to produce light.

2. The backplane of claim 1 where the drive signals cause the corresponding subsets of light emitters to produce light when the drive signals are applied but without persistent light production after the drive signals cease to be applied.

3. The backplane of claim 1 where the subframe comprises an N×2 array of pixels, and N is an even integer greater than 3.

4. The backplane of claim 1 where the data packet specifies a location of the subframe within the array of light emitters.

5. The backplane of claim 1 where the data packet specifies whether the drive signals turn off at an end of the subframe or stay on at the end of the subframe.

6. The backplane of claim 1 further comprising:
   a memory that stores pixel values of a previous subframe, where the data packet specifies whether to repeat the previous subframe.

7. The backplane of claim 1 where the data packet specifies the pixel values in the subframe using a combination of pulse width modulation and pulse amplitude modulation.

8. The backplane of claim 7 where, in accordance with the protocol, the pulse width modulation can be based on different gamma values, and the data packet specifies which gamma value is used.

9. The backplane of claim 7 where, in accordance with the protocol, the pulse width modulation can be based on different numbers of bits, and the data packet specifies the number of bits used.

10. The backplane of claim 7 where, in accordance with the protocol, the pulse amplitude modulation can be based on different numbers of bits, and the data packet specifies the number of bits used.

11. The backplane of claim 7 where the subframe comprises a plurality of pixels and the data packet specifies the pixels in the subframe using a combination of one or more group values that apply to more than one pixel in the subframe and pixel-specific values that apply to individual pixels in the subframe, where the one or more group values are based on pulse amplitude modulation and the pixel-specific values are based on pulse width modulation.

12. The backplane of claim 1 where the subframe comprises a plurality of pixels and the data packet specifies the pixels in the subframe using a combination of a global value that applies to all pixels in the subframe, local values that apply to groups of pixels in the subframe, and pixel-specific values that apply to individual pixels in the subframe.

13. The backplane of claim 12 where all the pixels within a group are a same color.

14. The backplane of claim 1 where the backplane detects when no data packets are received and powers down the frontplane based on detection of no data packets received.

15. The backplane of claim 1 where the backplane comprises a plurality of analog drivers that are coupled to drive the light emitters.

16. The backplane of claim 1 where the backplane consumes not more than 100 microwatts of power.

17. The backplane of claim 1 where the backplane is not larger than four $mm^2$.

18. The backplane of claim 1 where the smallest pitch between adjacent light emitters is less than 3 microns.

19. An eye-mounted display comprising:
   a contact lens; and
   a backplane and a frontplane that fit in the eye-mounted display, the frontplane containing an array of light emitters, the backplane receiving data packets that specify images to be projected by the frontplane, the backplane converting the data packets to drive signals that drive corresponding subsets of the light emitters in the frontplane, where:
      the data packets specify the images using a protocol that does not require receiving full frames for the entire array of light emitters;
      the data packets specify subframes to be projected by the corresponding subsets of light emitters; and
      the drive signals cause the corresponding subsets of light emitters to produce light.

20. A method for communicating images to be displayed by an eye-mounted display, the eye-mounted display comprising a backplane and a frontplane containing an array of light emitters, the method comprising:
   deconstructing the images into subframes to be projected by corresponding subsets of light emitters; and
   transmitting to the backplane data packets that specify the subframes, the transmission using a protocol that does not require receiving full frames for the entire array of light emitters, where the backplane converts the data packets to drive signals that cause the corresponding subsets of light emitters to produce light.

21. The backplane of claim 1 where sequential subframes received at the backplane are not required by the protocol to update the light emitters according to a predefined spatial order.

22. The backplane of claim 1 where the protocol does not require the entire array of light emitters to be refreshed at a constant rate.

* * * * *